United States Patent [19]
Chyung et al.

[11] Patent Number: 5,962,351
[45] Date of Patent: Oct. 5, 1999

[54] METHOD OF PRODUCING β-SPODUMENE BODIES

[75] Inventors: Kenneth Chyung, Painted Post; J. Paul Day; Louis M. Holleran, both of Big Flats; Anthony R. Olszewski, Bath, all of N.Y.

[73] Assignee: Corning Incorporated, Corning, N.Y.

[21] Appl. No.: 08/991,063

[22] Filed: Dec. 15, 1997

Related U.S. Application Data

[60] Provisional application No. 60/035,186, Jan. 13, 1997.

[51] Int. Cl.⁶ .............................. C03C 10/12; C03C 3/04
[52] U.S. Cl. .................... 501/7; 501/27; 501/128; 501/129; 65/33.8
[58] Field of Search .................... 501/7, 27, 128, 501/129; 65/33.8

[56] References Cited

U.S. PATENT DOCUMENTS

| | | |
|---|---|---|
| 3,600,204 | 8/1971 | Beall et al. . |
| 3,856,497 | 12/1974 | Hummel ........................ 501/7 |
| 3,938,978 | 2/1976 | Hummel ........................ 501/7 |
| 4,126,477 | 11/1978 | Reade . |
| 5,403,787 | 4/1995 | Day . |

FOREIGN PATENT DOCUMENTS

| | | |
|---|---|---|
| 0 101 911 | 3/1984 | European Pat. Off. . |
| 401203264 | 8/1989 | Japan . |
| 409030860 | 2/1997 | Japan . |
| 1331357 | 9/1973 | United Kingdom . |

OTHER PUBLICATIONS

JP 01 203264 A, Aug. 1989 Patent Abstracts of Japan, vol. 013, No. 504 (C–653), Nov. 1989.

*Primary Examiner*—Karl Group

[57] ABSTRACT

Beta-spodumene bodies and method of preparing the bodies that involves providing a uniform plastic batch of inorganic raw materials, organic binder, and vehicle, wherein the inorganic raw materials are composed of, in percent by weight, about 75% to 95% minerals, and about 5% to 25% glass. The batch is formed into a green body that is fired to produce a body composed substantially of beta-spodumene, and having a thermal expansion coefficient of $<10 \times 10^{-7}/°C$. (0–800° C.), and a strength of $\geq 4$ Ksi.

13 Claims, 2 Drawing Sheets

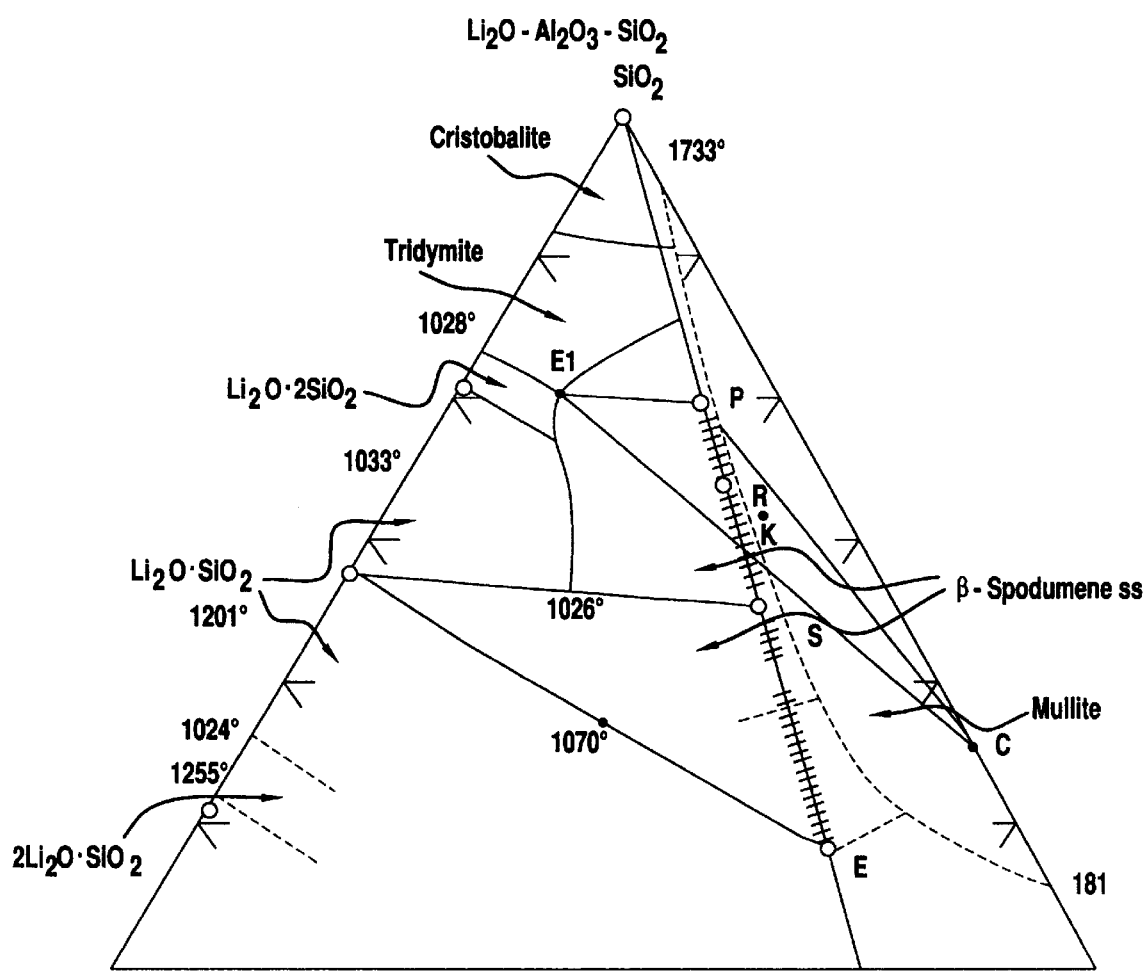

METHOD OF PRODUCING β-SPODUMENE BODIES

This application claims the benefit of U.S. Provisional Application No. 60/035,186, filed Jan. 13, 1997, entitled, METHOD OF PRODUCING BETA-SPODUMENE BODIES, by Kenneth Chyung, J. Paul Day, Louis M. Holleran and Anthony R. Olszewski.

The Government of the United States of America has rights in this invention pursuant to Contract No. DEN3-336 awarded by the Department of Energy.

This invention relates to low expansion beta-spodumene bodies, in particular honeycombs which are produced by plastic shaping mixtures of minerals as the major component and glass as the minor component. The amount of glass is designed to not only promote the sintering of the shaped body but also to react with the mineral batches completely. The beta-spodumene material has the properties of low thermal expansion with minimum microcrack-induced hysteresis, high strength, and low porosity. The bodies are therefore especially useful in applications demanding heat stability, high strength, corrosion and moisture resistance, such as for example in heat regenerator applications.

BACKGROUND OF THE INVENTION

U.S. Pat. No. 3,600,204 teaches a lower thermal expansion ceramic material for heat regenerator applications, namely, a lithium aluminosilicate (LAS) glass powder which is cerammed to low expansion beta-spodumene phase assemblage upon firing. The process of melting the batches to form LAS glass powders is a very expensive route to producing ceramic honeycombs due to the costs associated with the high temperature melting and powdering of glass into appropriate particle sizes. In addition, the extrusion of such glass powders is difficult, requiring large amounts of binders and plasticizers. There are difficulties in controlling the uniform crystallization process.

U.S. Pat. No. 5,403,787 relates to utilizing a mixture of glass and mineral batches for extruding and firing to produce low expansion LAS ceramic honeycombs. However, the contemplated extrusion batches still contain major portions of LAS glass powders and only 2–30% by weight of aluminosilicate clays.

It would be desirable and an advancement in the art to have a method of producing beta-spodumene bodies having the low expansion and high strength derived from primarily mineral batches with some low temperature melting glass, without incurring high costs especially those attributed to the glass constituent.

The present invention provides such a method by a material formulation, shaping, and reactive ceramming of primarily mineral batches with a minor amount of selected glass.

SUMMARY OF THE INVENTION

In accordance with one aspect of the invention, there is provided a method of preparing beta-spodumene bodies that involves providing a uniform plastic batch of inorganic raw materials, organic binder, and vehicle, wherein the inorganic raw materials are composed of, in percent by weight, about 75% to 95% minerals, and about 5% to 25% glass. The batch is formed into a green body that is fired to produce a body composed substantially of beta-spodumene, and having a thermal expansion coefficient of $<10\times10^{-7}/°C.(0–800° C.)$, and a strength of $\geq 4$ Ksi.

In accordance with another aspect of the invention, there is provided beta-spodumene bodies produced by the above-described method.

BRIEF DESCRIPTION OF THE DRAWINGS

FIG. 2 is a phase diagram of the $Li_2O$—$Al_2O_3$—$SiO_2$ system showing the compositions of petalite, clay and eutectic glass that are used in the practice of the present invention.

DETAILED DESCRIPTION OF THE INVENTION

Figure 1:
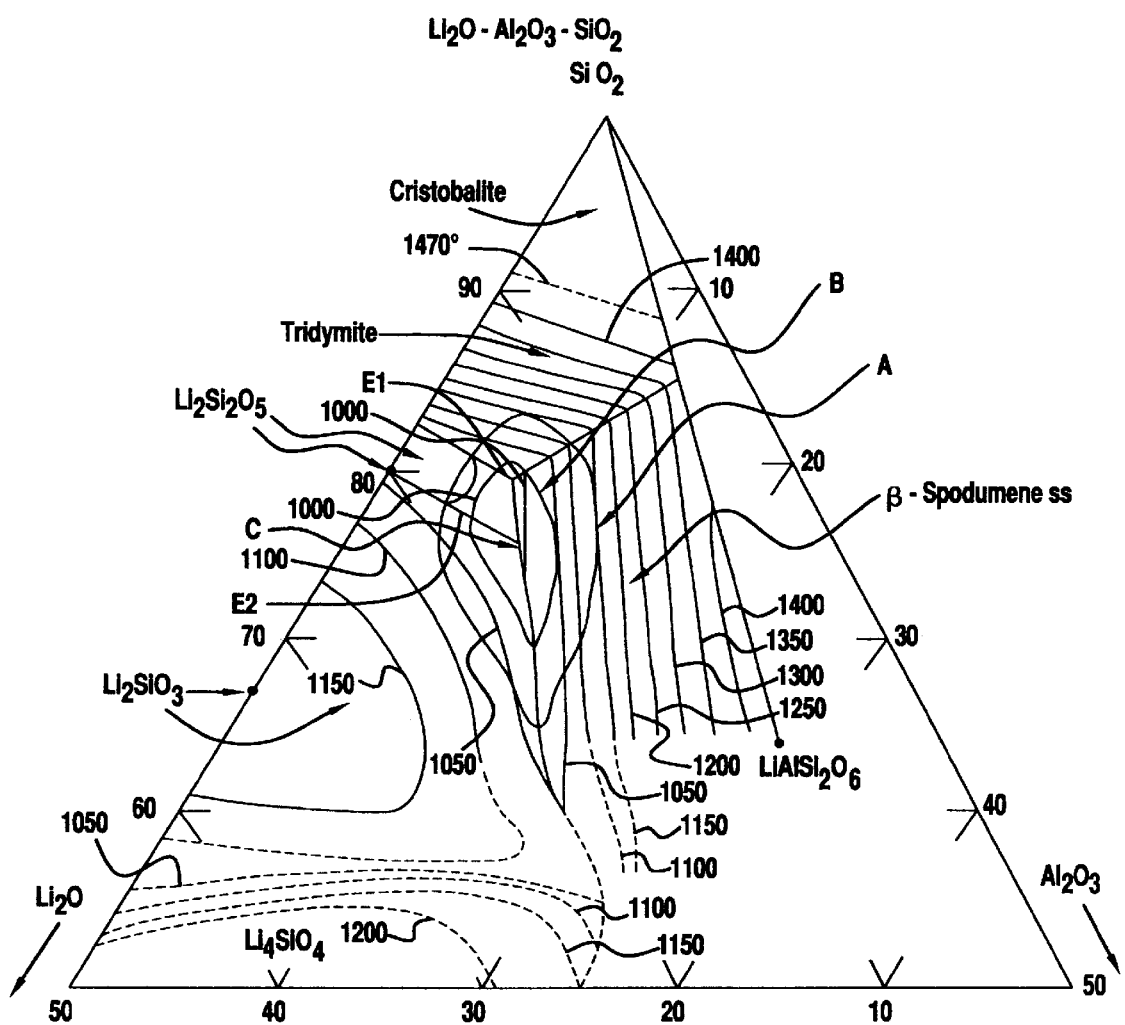
FIG. 1 is a phase diagram of the $Li_2O$—$Al_2O_3$—$SiO_2$ system delineating the area of low melting glass compositions near the ternary eutectic glasses $E_1$ and $E_2$

The present invention provides a low cost method of producing beta-spodumene bodies in which the beta-spodumene material has low thermal expansion, that is below about $10\times10^{-7}/°C.(0–800° C.)$, and typically about $3–7\times10^{-7}/°C.(0–800° C.)$, good strength, i.e., MOR $\geq 4$ Ksi, and more typically about 6–10 Ksi, low porosity, i.e. $\leq 35\%$ by volume total porosity, thermal stability up to about 1200° C., and resistance to moisture and corrosion, e.g. sulfur and salt corrosion. Such properties enable the bodies to be used successfully in turbine engine heat-regenerator applications, or in fact, in any application where such properties are desired. The low cost is achieved by using predominantly available mineral batches, but also by increasing the manufacturing efficiency through utilization of only a minor amount of glass, preferably low melting/fluid glass that facilitates the rapid sintering and reactivity.

The beta-spodumene body is made by formulating a plastic batch of the raw materials which when fired will yield predominantly the beta-spodumene crystal structure, i.e. 95–98%. The raw materials are made up of minerals as the major constituent, or about 75% to 95% by weight, and glass as the minor constituent or about 5% to 25% by weight. As discussed previously, having glass present in a minor amount allows more economical processing than with larger amounts, while retaining the advantages of sinterability. Also, it is to be understood that the batch can contain a minor amount of additives such as $TiO_2$.

The Mineral Component

The minerals are preferably aluminosilicate minerals such as petalite ($Li_2O.Al_2O_3.8SiO_2$) in combination with clay, but can also include other minerals such as spodumene, mullite, alumina, and silica.

The clay must be of fine particle size and be relatively pure in chemistry and impart plasticity to the batch. Among the clays that can be used in the practice of this invention are aluminosilicate clays such as kaolinitic clay. Although they contain measurable levels of a number of impurities, these clays are substantially entirely of aluminosilicate composition. Therefore, they can be added to the batch without introducing objectionable proportions of extraneous metals or metal oxides. One especially suitable clay is delaminated kaolinite having a particle size of about 1–3 micrometers, and a surface area of about 13–17 $m^2/g$, such as KAOPAQUE-10™ (K10), supplied by Dry Branch Kaolin, Dry Branch, Ga.

The particulate size of the mineral components must be fine enough and narrow in particle size distributions, suitable for the forming process, e.g. extrusion process. Fine particle size of minerals is also required to prevent formation of very large anisotropic beta-spodumene grains upon final sintering and crystallization. Too large a grain leads to microcracking of the beta-spodumene bodies that in turn results in expansion hysteresis and lowering of strength of the body. Typical particle sizes for the minerals are <50 micrometers, preferably ≦10 micrometers, and more preferably about 5 to 10 micrometers average particle diameter. Clays are typically provided as finer than about 5 micrometers average particle diameter.

The Glass Component

In order to obtain a high sintering rate, low porosity, rapid reactivity in primarily mineral mixtures, a small amount of glass is used. Although various silicate glasses can be used, it is preferred to use low melting ternary eutectic glass in the lithium aluminosilicate system. FIG. 1 is a phase diagram of the $Li_2O$—$Al_2O_3$—$SiO_2$ system delineating the area of low melting glass compositions used in the practice of this invention. The glass is composed preferably of in percent by weight about 65% to 85% SiO2, and about 3% to 15% $Al_2O_3$, and about 10% to 20% $Li_2O$, shown by area defined as A in FIG. 1. More preferably the glass is composed of in percent by weight about 69% to 82% $SiO_2$, about 5% to 13% $Al_2O_3$, and about 13% to 18% $Li_2O$, shown as area B in FIG. 1. Some specific examples of lithium aluminosilicate glasses that can be used in the batches of this invention are given in Table 1 below. Powders of glasses having compositions such as described in Table 1 can be prepared by dry-gaging the glass melts or crushing patties of the glass, and then grinding the resulting particulate glass to the desired particle size. Particle sizes of less than 50 micrometers average diameter are suitable.

The purpose of using a low temperature melting glass is (a) to facilitate a liquid phase sintering for rapid consolidation, and (b) to react with the mineral batches to the desired phase assemblage, which consist of low thermal expansion beta-spodumene solid solution and a minor amount of mullite.

Low melting stable glasses lie near the eutectic glasses $E_1$ and $E_2$ and along the cotectic line, (C), extending to lower $SiO_2$, as shown in FIG. 1. It is important that $Li_2O$ does not exceed about 18%, beyond which the glass becomes unstable with respect to lithium metasilicate. Premature crystallization of the glass deprives the mixed batch of liquid phase sintering, and prevents the consolidation.

Table 1 lists some of the glass compositions with melting points below about 1100° C. An especially preferred glass is the high $SiO_2$ eutectic glass $E_1$ (No.2 in Table 1), which has a melting point of 980° C. with better glass stability than eutectic $E_2$ (No.3 in Table 1).

Use of eutectic glass, by virtue of its low fluidity, good glass stability, and relatively low melting point, is an efficient approach to obtaining a rapid liquid phase sintering rate and complete reactivity with the mineral component.

The Organic Binder

The organic binder contributes to the plasticity of the mixture for shaping into a body. The plasticizing organic binder according to the present invention refers to cellulose ether binders. Some typical organic binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M from Dow Chemical Co. Methocel A4M is a methylcellulose binder having a thermal gel point of about 50° C., and a gel strength of 5000 g/cm (based on a 2% solution at 65° C.). Methocel F4M, F240, and K75M are hydroxypropyl methylcellulose. Methocels F4M and F240 have thermal gel points of about 54° C. Methocel K75M has a gel point of about 70° C. (all based on a 2% solution in water).

Optional additions such as alumina ($Al_2O_3$), silica ($SiO_2$), or titania ($TiO_2$) can be included in the batch. Titanium dioxide is present typically at a level of 0 to about 5% by weight and is used as an agent to prevent the formation of undesirable high expansion cristobalite phase.

The vehicle can be inorganic, i.e. consisting largely of water, or it can be organic. The use of water is preferred, although evaporable organic liquids such as lower alkanols can be wholly or partly substituted as desired.

Lubricants can also be included in the batch, such as for example, sodium, ammonium, or diglycol stearate.

The weight percents of the organic binder, vehicle and other additives are calculated as superadditions with respect to the raw materials (the minerals and glass).

Extrusion Batch Formulation

Some especially useful batch compositions are in weight percent about 40% to 80% petalite, about 10% to 35% clay, and about 5% to 25% glass, about 2% to 8% cellulose ether binder, preferably methylcellulose and/or methylcellulose derivatives, and about 15% to 30% water, and preferably about 53% to 65% petalite, about 22% to 29% clay, about 14% to 21% eutectic glass, about 3% to 6% binder, and about 21 to 27% water. Table 2 shows some especially useful batch formulations.

The batch components deliver a weight composition in the final sintered body of about 4% to 6% $Li_2O$, about 18% to 25% $Al_2O_3$, about 68% to 75% $SiO_2$, and 0 to about 5% $TiO_2$ as an optional ingredient to prevent formation of cristobalite, and preferably about 4.5% to 5.5% $Li_2O$, about 18.5% to 23% $Al_2O_3$, about 70% to 75% $SiO_2$, and 0 to about 3% $TiO_2$. The mole ratio of $Al_2O_3/Li_2O$ is about 1.05 to 1.50, and preferably about 1.10 to 1.3 FIG. 2 shows the triangle $E_1$PC, apices of each represent the eutectic glass ($E_1$), petalite (P), and clay (C). Any composition lying within the triangle, such as composition K for example, can be formulated by using appropriate combinations of composition $E_1$, P, and C. Any additional components such as $SiO_2$ or $TiO_2$ can also be added by simply adding the constituents in excess to form a desired composition.

Mixing is conventionally carried out in a high shear mixer such as a muller-mixer.

Shape Processing

The batch is then plastically formed into a green body. The forming can be done by any method such as extrusion, injection molding, or jiggering.

The preferred method of forming is by extrusion through a die. Extrusion can be done by using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The bodies according to the present invention can have any convenient size and shape. However, the process is especially suited to production of cellular bodies such as honeycombs. Cellular bodies find use in a number of applications such as catalyst carriers, filters such as diesel particulate filters, molten metal filters, regenerator cores, etc.

Some examples of honeycombs produced by the process of the present invention, but not limited to, are those having about 62 cells/cm$^2$ to 171 cells/cm$^2$ (about 400 cells/in$^2$ to 1100 cells/in.$^2$). Typical wall thicknesses are for example, about 0.15 mm (about 6 mils) for about 62 cells/cm$^2$ (about 400 cells/in$^2$) honeycombs. Wall (web) thicknesses range typically from about 0.1 to about 0.6 mm (about 4 to about 25 mils). The external size and shape of the body is controlled by the application.

The resulting shaped body is then fined to react the minerals and glass and to form a phase assemblage consisting essentially of beta-spodumene as the predominant phase. The firing is done in air at temperatures in the range of about 1100° C. to 1350° C. for about 2 to 10 hours.

To more fully illustrate the invention, the following non-limiting examples are presented. All parts, portions, and percentages are on a weight basis unless otherwise stated.

EXAMPLE 1

A dry batch was prepared from clay and petalite minerals and dry blended with glass powder and organic additives in weight percentages listed below. The glass powder of oxide composition given as #2 in Table 1 was prepared by first melting oxides and minerals at about 1000° C. for several hours and then dry gauging and grinding of the glass to an average particle size of about 10 micrometers in diameter The blended batch was then mixed with water and plasticized in a muller mixer to achieve a thorough, uniform mixture. The amount of water used is given below. This batch was then extruded under vacuum through a die into thin strands to remove any entrapped air. The plastic strands were then extruded through a small (8.9 cm×8.9 cm, 171 cells/cm$^2$ (3.5"×3.5", 1100 cell/in.$^2$)) square die to form a honeycomb structure. The green unfired structure was dried, cut into 10 cm (4") long samples and fired to a peak temperature of about 1310° C. for about 10 hours to effect a thorough sintering of the green material and to achieve the desired beta-spodumene body. These samples were then tested and the physical properties are given below.
Extrusion batch composition:
  62.6% calcined petalite
  23.2% K10 delaminated kaolinite
  14.2% glass (#2 in Table 1)
  4.0% A4M Methocel$^R$
  0.75% sodium stearate
  27.0% water
Properties obtained after heat-treating to about 1310° C. for about 10 hours.

MOR axial 1518 psi
  Porosity 29.0 vol. %
  CTE@0–800° C. cooling curve 3.3×10$^7$/°C.

EXAMPLE 2

Similar to Example 1, a dry batch was prepared from clay and petalite minerals and dry blended with glass powder and organic additives in the weight percentages listed below. The glass powder was prepared as described above. The blended batch was then mixed with water and plasticized in a muller mixer to achieve a thorough, uniform mixture. The amount of water used has been listed below. This batch was then extruded under vacuum through a die into thin strands to remove any entrapped air. The plastic strands were then extruded through a large frontal area die of about 26.7 cm (about 10.5") in diameter and 171 cells/cm$^2$ (1100 cell/in.$^2$) to form a honeycomb structure. The green unfired structure was dried, cut into cm 10.1 cm (4") long samples and fired to a peak temperature of about 1310° C. for about 10 hours to effect a thorough sintering of the green material and to achieve the desired beta-spodumene body. Samples cut from these regenerator cores were then tested and the physical properties obtained are listed below.
Extrusion batch composition:
  47.2% calcined petalite
  33.4% K10 delaminated kaolinite
  19.4% glass (#2 in Table 1)
  3.0% A4M Methocel$^R$
  1.0% sodium stearate
  29.0% water
Properties obtained after heat-treating to about 1310° C. for about 10 hours.

MOR axial 1210 psi
  Porosity 19.0 vol. %
  CTE@0–800° C. cooling curve 6.0×10$^{-7}$/°C.

TABLE 1

LOW TEMPERATURE GLASS COMPOSITIONS SUITABLE FOR REACTIVE CERAMMING (WT %)

|  | 1 | 2 | 3 | 4 | 5 | 6 | 7 |
|---|---|---|---|---|---|---|---|
| SiO$_2$ | 69.5 | 79.0 | 76.0 | 77.5 | 82.0 | 80 | 74.5 |
| Al$_2$O$_3$ | 12.5 | 6.5 | 8.0 | 5.0 | 5.0 | 7 | 12.5 |
| Li$_2$O | 18.0 | 14.5 | 16.0 | 17.5 | 13.0 | 13 | 13 |
| Melting Point | 1030° C. | 980° C. | 980° C. | 1000° C. | 1070° C. | 1000° C. | 1100° C. |

TABLE 2

TYPICAL BATCH FORMULATIONS AND PROPERTIES

|  | 1 | 2 | 3 | 4 | 5 | 6 | 7 |
|---|---|---|---|---|---|---|---|
| Batch (wt %) | | | | | | | |
| Petalite | 45.8 | 62.9 | 54.2 | 71.0 | 77.6 | 56.6 | 51.2 |
| Kaolin | 33.8 | 23.2 | 28.5 | 21.9 | 12.7 | 24.5 | 29.1 |
| Glass (#2 in Table 1) | 20.4 | 14.2 | 17.3 | 7.2 | 8.8 | 18.9 | 19.7 |
| Titania | — | — | — | — | 1.0 | — | — |
| Water | 27.0 | 27.0 | 27.0 | 27.0 | 27.0 | 27.0 | 27.0 |
| Methocel A4M | 3.0 | 3.0 | 3.0 | 3.0 | 3.0 | 3.0 | 3.0 |

TABLE 2-continued

TYPICAL BATCH FORMULATIONS AND PROPERTIES

| | 1 | 2 | 3 | 4 | 5 | 6 | 7 |
|---|---|---|---|---|---|---|---|
| Composition (wt %) | | | | | | | |
| $SiO_2$ | 72.0 | 74.6 | 73.3 | 75.0 | 77.1 | 74.3 | 73.1 |
| $Al_2O_3$ | 23.0 | 20.7 | 21.9 | 21.0 | 18.4 | 20.6 | 21.8 |
| $Li_2O$ | 5.0 | 4.7 | 4.8 | 4.0 | 4.5 | 5.2 | 5.1 |
| $TiO_2$ | — | — | — | — | 1.0 | — | — |
| Heat Treatment @ 1290° C. for 10 hrs. | | | | | | | |
| MOR (Ksi) | 9.2 | 7.5 | 8.6 | 11.0 | 7.1 | 7.0 | 8.5 |
| % Porosity | 27.1 | 27.1 | 24.3 | 2.2 | 2.1 | 27.6 | 25.4 |
| CTE (ppm/EC) | 0.62 | 0.50 | 0.55 | 0.65 | 0.35 | 0.34 | 0.55 |
| Heat treatment @ 1275° C. for 10 hours | | | | | | | |
| MOR (KSI) | 9.0 | 7.7 | 8.4 | 10.1 | 6.0 | 7.3 | 8.8 |
| % porosity | 25.8 | 29.1 | 28.5 | 19.3 | 17.6 | 31.2 | 27.5 |
| CTE (ppm/° C.) | 0.68 | 0.50 | 0.55 | 0.66 | 0.33 | 0.38 | 0.51 |
| Heat treatment @ 1310° C. for 10 hours | | | | | | | |
| MOR (KSI) | 9.7 | 7.8 | 8.5 | 10.5 | 8.0 | 6.1 | 7.8 |
| % porosity | 24.0 | 19.0 | 21.0 | 1.0 | 1.0 | 26.1 | 27.5 |
| CTE (ppm/° C.) | 0.63 | 0.42 | 0.59 | 0.61 | 0.38 | 0.2 | 0.49 |

It should be understood that while the present invention has been described in detail with respect to certain illustrative and specific embodiments thereof, it should not be considered limited to such but may be used in other ways without departing from the spirit of the invention and the scope of the appended claims.

We claim:

1. A method of preparing a beta-spodumene body, the method comprising:
    a) providing a uniform plastic batch comprising inorganic raw materials, organic binder, and vehicle, wherein the inorganic raw materials are composed of, in percent by weight, about 75% to 95% minerals, and about 5% to 25% lithium aluminosilicate powdered glass;
    b) plastic forming the batch into a green body; and
    c) firing the green body to produce a body composed substantially of beta-spodumene, wherein the fired body has a thermal expansion coefficient of $<10 \times 10^{-7}/°C.(0-800° C.)$, and a strength of $\geq 4$ Ksi.

2. A method of claim 1 wherein the minerals are petalite and clay.

3. A method of claim 2 wherein the minerals are composed of in percent by weight about 40% to 80% petalite and about 10% to 35% clay.

4. A method of claim 3 wherein the minerals are composed of in percent by weight about 53% to 65% petalite and about 22% to 29% clay.

5. A method of claim 2 wherein the glass is composed of in percent by weight about 65% to 85% $SiO_2$, and about 3% to 15% $Al_2O_3$, and about 10% to 20% $Li_2O$.

6. A method of claim 5 wherein the glass is composed of in percent by weight about 69% to 82% $SiO_2$, about 5% to 13% $Al_2O_3$, and about 13% to 18% $Li_2O$.

7. A method of claim 2 wherein the plastic batch is composed of in percent by weight about 40% to 80% petalite, about 10% to 35% clay, and about 5% to 25% glass, about 2% to 8% cellulose ether binder, and about 15% to 30% water.

8. A method of claim 5 wherein the plastic batch is composed of in percent by weight 53% to 65% petalite, about 22% to 29% clay, about 14% to 21% eutectic glass, about 3% to 6% binder, and about 21 to 27% water.

9. A method of claim 1 wherein the minerals have an average particle diameter <50 micrometers.

10. A method of claim 1 wherein the minerals have an average particle diameter <10 micrometers.

11. A method of claim 1 wherein the plastic batch is formed into a honeycomb.

12. A method of claim 1 wherein the plastic forming is done by extrusion.

13. A method of claim 12 wherein the extruded green body is a honeycomb structure.

* * * * *

UNITED STATES PATENT AND TRADEMARK OFFICE
CERTIFICATE OF CORRECTION

PATENT NO. : 5,962,351
DATED : October 5, 1999
INVENTOR(S) : Chyung et al.

It is certified that error appears in the above-identified patent and that said Letters Patent is hereby corrected as shown below:

Title page, second column, please insert:

--*Attorney, Agent, or Firm*—L. Rita Herzfeld--.

Column 4, line 4, "5000 g/cm" should be --5000 $g/cm^2$--.

Column 5, line 14, "fined" should be --fired--.

Column 5, line 31, after "diameter" insert -- . --

Signed and Sealed this

Ninth Day of May, 2000

Attest:

Q. TODD DICKINSON

*Attesting Officer*          *Director of Patents and Trademarks*